(12) United States Patent
Behmlander et al.

(10) Patent No.: US 10,040,096 B2
(45) Date of Patent: Aug. 7, 2018

(54) ABRASION RESISTANT MATERIAL TANDEM WELDING

(71) Applicant: Caterpillar Inc., Peoria, IL (US)

(72) Inventors: Matthew Behmlander, Metamora, IL (US); Christopher Barnes, Peoria, IL (US); Matthew Robinson, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 599 days.

(21) Appl. No.: 14/802,617

(22) Filed: Jul. 17, 2015

(65) Prior Publication Data

US 2017/0014864 A1    Jan. 19, 2017

(51) Int. Cl.
*B05D 5/00* (2006.01)
*B23K 9/04* (2006.01)
*B23K 9/173* (2006.01)

(52) U.S. Cl.
CPC ............... *B05D 5/00* (2013.01); *B23K 9/044* (2013.01); *B23K 9/1735* (2013.01)

(58) Field of Classification Search
CPC ........ B23K 9/04; B23K 9/1735; B23K 9/167; B23K 9/23; B23K 9/121; B23K 9/293; B23K 9/295; B05D 5/00
See application file for complete search history.

(56) References Cited

U.S. PATENT DOCUMENTS

| 2,003,167 | A | * | 5/1935 | Alexander | B05B 7/226 |
| | | | | | 105/458 |
| 6,023,043 | A | | 2/2000 | Manabe et al. | |
| 8,678,265 | B2 | | 3/2014 | Baek | |
| 8,721,761 | B2 | | 5/2014 | Fischer et al. | |
| 8,742,292 | B2 | | 6/2014 | Fukunaga et al. | |
| 8,941,031 | B2 | | 1/2015 | Behmlander et al. | |
| 8,952,292 | B2 | | 2/2015 | Behmlander et al. | |
| 2008/0308539 | A1 | | 12/2008 | Flagg et al. | |
| 2011/0290771 | A1 | | 12/2011 | Fukunaga et al. | |
| 2012/0097658 | A1 | * | 4/2012 | Wallin | B23K 35/22 |
| | | | | | 219/146.22 |
| 2012/0325779 | A1 | * | 12/2012 | Yelistratov | B23K 9/04 |
| | | | | | 219/76.14 |
| 2013/0193115 | A1 | * | 8/2013 | Berg | B23K 9/122 |
| | | | | | 219/74 |
| 2013/0327749 | A1 | | 12/2013 | Denney et al. | |
| 2014/0008334 | A1 | | 1/2014 | Ash et al. | |
| 2014/0042131 | A1 | | 2/2014 | Ash | |
| 2014/0175076 | A1 | | 6/2014 | Wang et al. | |

(Continued)

FOREIGN PATENT DOCUMENTS

DE    102012217669 A1    3/2014
EP    2193869 B1    7/2013

(Continued)

*Primary Examiner* — Geoffrey S Evans

(74) *Attorney, Agent, or Firm* — Baker Hostetler

(57) ABSTRACT

A system of coating a component or part of a vehicle, device, or an apparatus with an abrasive resistant material (ARM) in order to increase the component or part's life cycle. A welding system can be used to deposit ARM between a lead electrode and a trail electrode and also deposit ARM behind the trail electrode. The welding system can also be used to deposit ARM that includes a lead electrode depositing the steel material and a trailing electrode that delivers an alloying material.

20 Claims, 4 Drawing Sheets

(56) References Cited

U.S. PATENT DOCUMENTS

| | | |
|---|---|---|
| 2014/0263232 A1 | 9/2014 | Peters et al. |
| 2014/0263233 A1* | 9/2014 | Peters .................. B23K 9/1006 219/130.1 |
| 2014/0263234 A1 | 9/2014 | Peters et al. |
| 2015/0028010 A1 | 1/2015 | Peters |
| 2015/0028011 A1 | 1/2015 | Peters |

FOREIGN PATENT DOCUMENTS

| | | | |
|---|---|---|---|
| JP | 58-135771 A | * | 8/1983 |
| JP | 59-033076 A | | 2/1984 |
| WO | 2012111414 A1 | | 8/2012 |

* cited by examiner

ABRASION RESISTANT MATERIAL TANDEM WELDING

TECHNICAL FIELD

The disclosure relates to the use of welding to apply abrasion resistant material, and more specifically, relating to using tandem welding to apply an abrasion resistant material (ARM) on a machine part or component.

BACKGROUND

Large earthmovers such as mining equipment are used in harsh conditions. In track-type machines, such as dozers, loaders, excavators and the like, the tracks may be covered by shoes incorporating outwardly projecting grousers which engage the ground and provide enhanced traction during use. As the grousers wear down, traction decreases. This decrease in traction gives rise to enhanced slippage when the machine is moving heavy loads. To compensate for such slippage, an operator may be required to reduce the average mass per load being transported. Over time, this correlates to a reduction in overall productivity. By way of example only, the overall productivity of a dozer having worn grousers may be reduced by about 30% relative to a dozer with new grousers. That is, in a given time, the dozer with worn grousers moves about 30% less material between two defined locations. This reduction in productivity is due to a reduction in the average mass that can be pushed by the machine without slipping as material is moved from point to point. Moreover, rapid wear of grousers requires more frequent replacement of the track shoes. Typical maintenance time for replacement of the track shoes on a dozer is about 8 hours. During this replacement period the machine is unavailable for work, thereby resulting in further productivity losses. Accordingly, premature wear of grousers is recognized as undesirable.

U.S. Patent Publication No. 2008/0308539 discloses a tandem welding carriage having at least two welding carriages coupled to each other. Each of the welding carriages having a base, rear wheel assemblies disposed at one end of the base, and welding attachment portions. The two welding carriages are coupled to each other using a coupling member, and each welding carriage is carrying an arc welding device and/or spool to allow for tandem arc welding. Abstract. However, the disclosed equipment does not address adding ARM materials.

Thus, there is a need for an improved process that deposits ARM material on to a work piece and decrease the amount of unwanted distortion.

SUMMARY

In one aspect, a system for coating a component includes a first electrode configured to receive a first consumable material from a first feeder, a first contact positioned at an end of the first electrode, a first power supply that provides power to the first contact, a second electrode configured to receive a second consumable material from a second feeder, a second contact positioned at an end of the second electrode, a second power supply that provides power to the second contact, a gas supply of a shielding gas that is coupled to the first and second contacts, a controller configured to control the first power supply, the second power supply, the first feeder and the second feeder, wherein the first contact creates an arc that forms a weld pool on a work piece, and an abrasive resistant material source that deposits a first amount of an abrasive resistant material between the first and second contacts and a second amount of the abrasive resistant material behind the second contact, wherein the first and second amounts of the abrasive resistant material are deposited into the weld pool.

In another aspect, a system for coating a component includes a first electrode configured to receive a consumable material from a first feeder, a first contact positioned at an end of the first electrode, a first power supply that provides power to the first contact, a second electrode configured to receive a consumable alloy material from a second feeder, a second contact positioned at an end of the second electrode, a second power supply that provides power to the second contact, a gas supply of a shielding gas that is coupled to the first and second contacts, and a controller configured to control the first power supply, the second power supply, the first feeder and the second feeder, wherein the first contact creates an arc that forms a weld pool on a work piece, an abrasive resistant material source that deposits a first amount of an abrasive resistant material between the first and second contacts.

In still another aspect, a system for coating a component includes a first electrode configured to receive a consumable material, a first contact positioned at an end of the first electrode, a second electrode, a second contact positioned at an end of the second electrode, a power supply that provides power to the first and second contacts, a gas supply of a shielding gas that is coupled to the first and second contacts, a controller configured to control the power supply, wherein the first and second contacts create an arc that forms a weld pool on a work piece, and an abrasive resistant material source that deposits a first amount of the abrasive resistant material between the first and second contacts and a second amount of the abrasive resistant material behind the second contact.

DETAILED DESCRIPTION

Various aspects of the disclosure provide exemplary systems for applying an abrasion resistant material (ARM) to a work piece. In one aspect of the disclosure, a welding system can be used to deposit ARM between/behind two electrodes. In a second aspect of the disclosure, a welding system can be used to deposit ARM that includes a lead electrode depositing the steel material and an alloying electrode that delivers alloys. Although machines or vehicles are discussed herein, the various aspects of the disclosure may be used in any component, part or device that utilizes an ARM in order to increase its life cycle.

Figure 1:
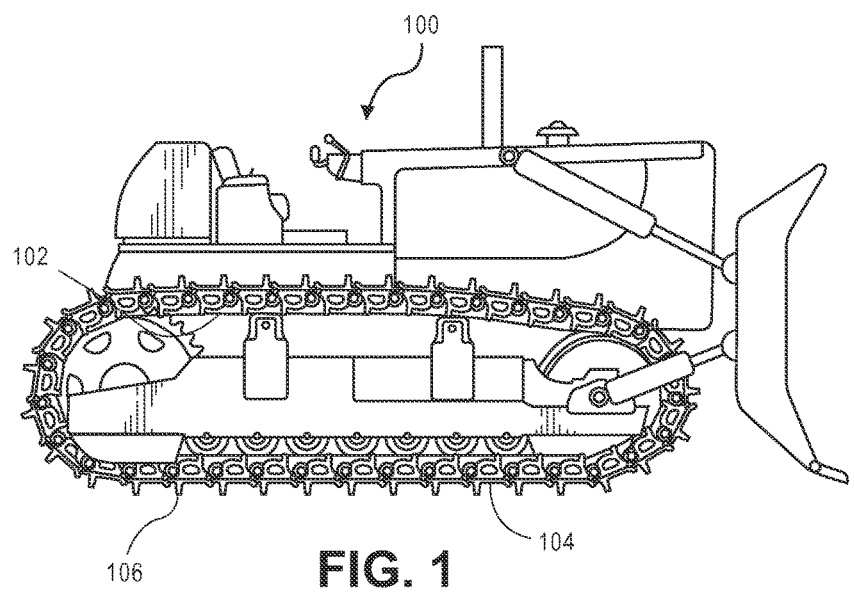
FIG. 1 illustrates is a side view of an exemplary track-type machine according to an aspect of the disclosure.

FIG. 1 illustrates is a side view of an exemplary track-type machine 100 according to an aspect of the disclosure. The exemplary track-type machine 100 performs some type of operation associated with an industry such as mining, construction, farming, transportation, or any other industry known in the art. The machine 100 includes a track 102 with an arrangement of track shoes 104 at the exterior of the track 102. The track shoes 104 are adapted to engage the ground during operation and can include grousers 106. The grouser 106 is a protrusion from the track shoes 104 and operates to increase traction in gravel, soil or snow. Thus, the grouser 106 and the track 102 may be coated with an ARM in order to increase their life cycle and also provide ground gripping materials. The machine 100 may be an earth moving machine such as a dozer excavator, loader, or the like. However, the machine 100 may be any other vehicle that includes components that may wear out due to abrasions with other materials.

Figure 2:
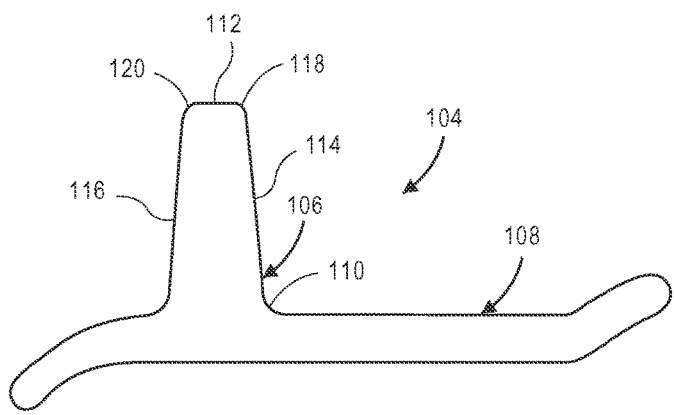
FIG. 2 illustrates is a side view of an exemplary track shoe for use on a track-type machine of FIG. 1 according to an aspect of the disclosure.

FIG. 2 illustrates is a side view of an exemplary track shoe 104 for use on a track-type machine of FIG. 1 according to an aspect of the disclosure. An exemplary track shoe 104 may include a base plate 108 and a grouser 106 projecting away from the base plate 108. The grouser 106 normally extends across the base plate 108 so as to be oriented in substantially transverse relation to the travel direction of the track 102 during operation. As the track 102 moves, the grouser 106 digs into the ground and provides enhanced traction. The grouser 106 is characterized by a generally pyramidal cross-section including a grouser base 110 in proximal relation to the base plate 108 and a distal edge surface 112 defining a relatively narrow width plateau in elevated relation to the grouser base 110. A first lateral face 114 and a second lateral face 116 extend in diverging, angled relation away from opposing perimeter edges of the distal edge surface 112 towards the grouser base 110. The intersection between the distal edge surface 112 and the first lateral face 114 defines a first corner transition zone 118. The intersection between the distal edge surface 112 and the second lateral face 116 defines a second corner transition zone 120. The first corner transition zone 118 and/or the second corner transition zone 120 may be slightly rounded as illustrated or may incorporate sharp corners if desired. According to one formation practice, the track shoe 104 may be formed by a rolling operation applied to an ingot such that the base plate 108 and the grouser 106 are integrally formed from a common ductile material such as a plain machineable carbon steel or the like. As will be appreciated, while the use of ductile materials may aid in formation of the track shoe 104, such materials may also be susceptible to wear during use in an abrasive environment and thus, an ARM coating can be applied to reduce the wear over time.

Figure 3:
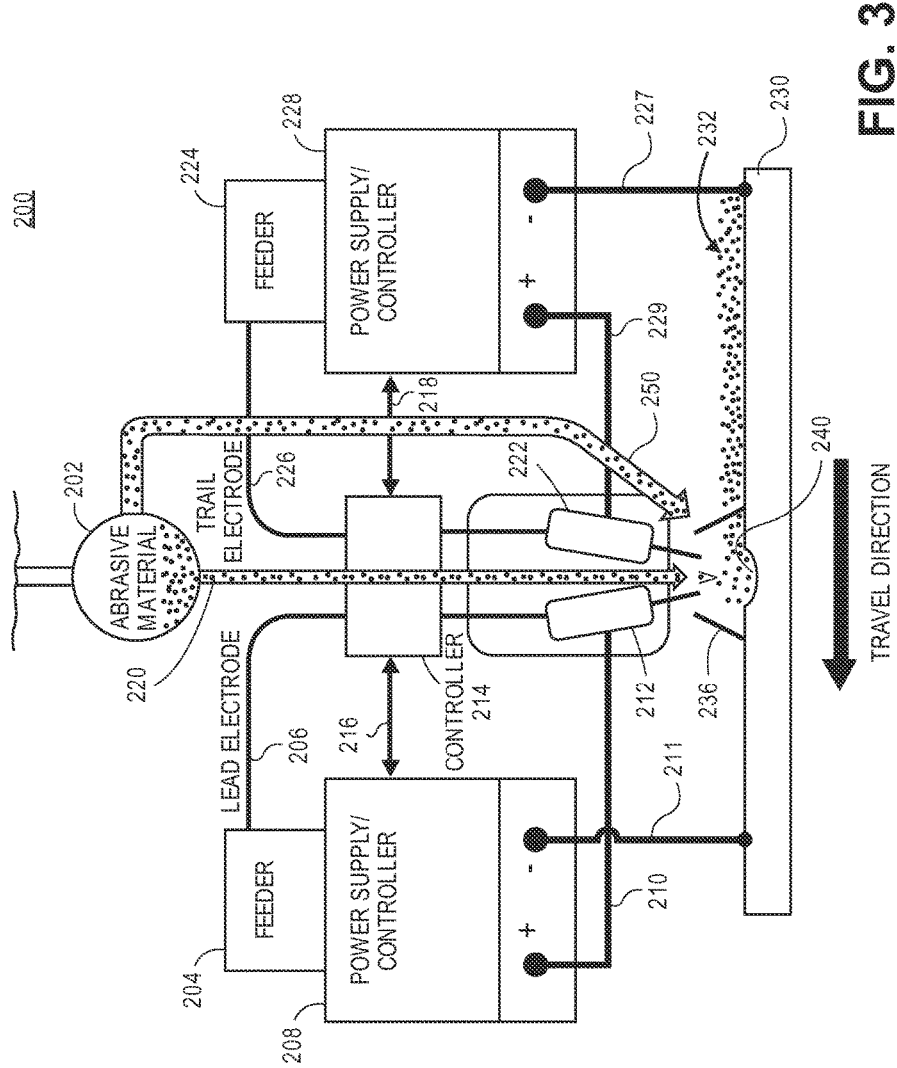
FIG. 3 illustrates a schematic diagram of a first exemplary welding system depositing an abrasion resistant material according to an aspect of the disclosure.

FIG. 3 illustrates a schematic diagram of a first exemplary welding system 200 depositing an abrasion resistant material according to an aspect of the disclosure. In this aspect of the disclosure, an ARM is added to the molten weld pool of a work piece that is heated by electrodes. An ARM source 202 may include any ARM such as tungsten carbide, silicon carbide, boron carbide, boron nitride, titanium carbide or the like. However, any abrasion resistant material that posses the ability to withstand mechanical actions such as rubbing, scraping, or erosion can be used. U.S. Pat. No. 8,721,761 entitled "Abrasion Resistant Composition," issued on May 13, 2014 is incorporated herein by reference, and further discusses ARM. The ARM source can provide ARM material via first path 220 and/or second path 250 and can include various hoses (not shown) that provide the necessary components to help deposit the ARM material.

Components related a first contact 212 may include a first feeder 204 that may feed the consumable lead welding electrode 206 with a consumable electrode material such as mild carbon steel, which may ultimately be deposited into the molten weld pool 240. The first feeder 204 may include a spool of the consumable electrode that has its wire speed controlled by a controller 214. The controller 214 can also control the first welding power supply/controller 208 through a first connection 216. The first connection 216 to the first welding power supply 208 and the first feeder 204 may be wired or wireless. In one aspect of the disclosure, the power supply 208 can have its own controller. The first welding power supply 208 provides power to the first contact 212 via a first power line 210 and grounds to the work piece 230 via a first ground line 211. In another aspect of the disclosure, the controller 214 can control robot arms (not shown) that move the first contact 212 during the welding process.

Figure 4:
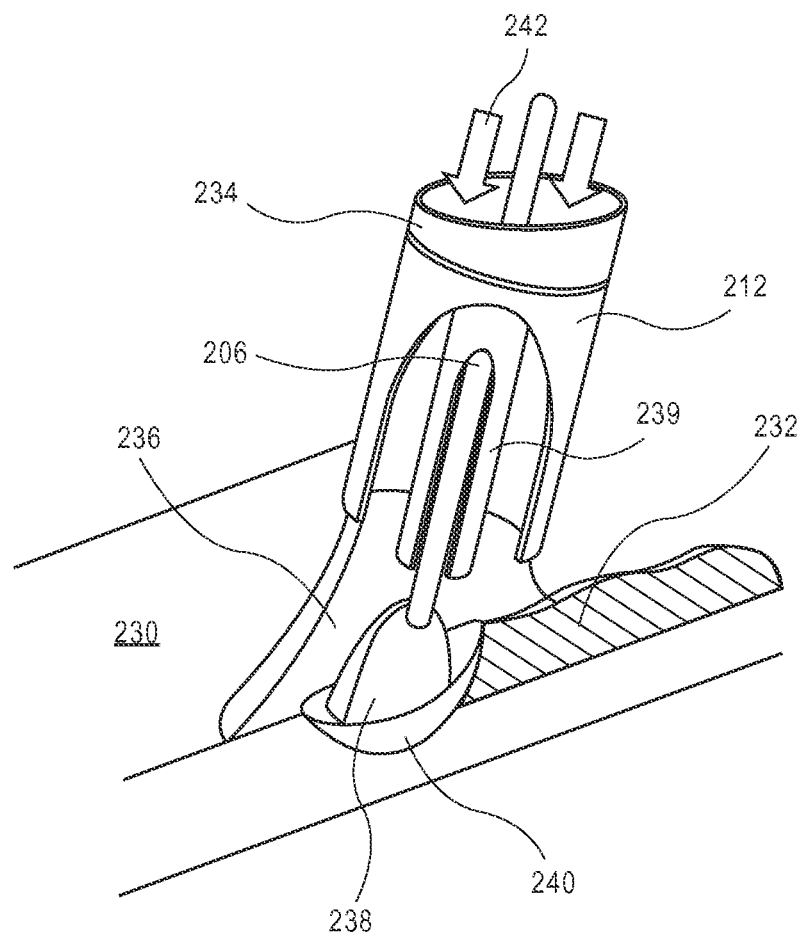
FIG. 4 illustrates an exemplary contact of an electrode according to an aspect of the disclosure.

FIG. 4 illustrates an exemplary contact of an electrode. The contact is applicable to any electrode including the lead or trail or alloying electrode and can be a contact used in various welding processes such as metal inert gas (MIG) welding (short circuit, spray transfer, or pulsed) and the like. First contact 212 includes a contact tip 239 that positively charged and receives lead welding electrode 206, a gas nozzle 234 to flow a gas 242, such as a shielding gas (argon, helium, nitrogen, carbon dioxide, etc.), which ultimately forms a gas shielding 236 to prevent atmospheric contamination. In MIG welding, a consumable wire electrode, such as the lead welding electrode 206 and the gas shield 236 are utilized. Additionally, a circuit or an arc 238 is formed between the lead welding electrode 206 (positively charged) and the work piece 230 (negatively charged) and simultaneously melts the work piece 230 and the lead welding electrode 206 to form a weld pool 240. Gas shielding 236 prevents atmospheric contamination, stabilizes the arc 238 and ultimately ensures a smooth transfer of the melted lead welding electrode 206 into the weld pool 240. The weld pool 240 ultimately forms a weld layer 232 once the weld pool 240 solidifies.

Returning to FIG. 3, components related a second contact 222 may include a second feeder 224 that may feed the consumable trail electrode 226 with a consumable electrode material such as mild carbon steel, which may ultimately be deposited into the molten weld pool 240. The second consumable trail electrode 226 may be made of the same or different consumable material as the first consumable lead welding electrode 206. The second feeder 224 may include a spool of the consumable electrode that has its wire speed controlled by the controller 214. The controller 214 can also control the second welding power supply/controller 228 through a second connection 218. The second connection 218 to the second welding power supply 228 and the second feeder 224 may be wired or wireless. In one aspect of the disclosure, the second power supply 228 can have its own controller. The second welding power supply 228 provides power to the second contact 222 via a second power line 229 and grounds to the work piece 230 via a second ground line 227.

In operation, the controller 214 can control the process via first connection 216 in which the lead welding electrode 206 is supplied with steel from the first feeder 204 and power from the first welding power supply 208 via first power line 210. The first contact 212 can create the gas shielding 236 through the supply of shielding gas (not shown) and the arc 238, which forms the weld pool 240 on the work piece 230. The gas shielding 236 controls the deposition of the melted steel generated by the first contact 212. Thus, portions of the consumable lead welding electrode 206 are deposited into the weld pool 240 in order to maintain it at or around a melting temperature of the material of the work piece 230. The work piece 230 may be made of a material including any type of consumable material such as mild carbon steel or high carbon steel. During or shortly after the weld pool 240 is created by the lead welding electrode 206, a first amount of ARM can be deposited via a first path 220 between the first contact 212 of the lead welding electrode 206 and the second contact 222 of the trail electrode 226. The ARM may be delivered by gravity and/or power feeding methods using multiple drop tube as an example.

Further, during, simultaneously or shortly after deposition of the ARM via first path 220 (after the first contact 212 of the lead welding electrode 206), the controller 214 can control via the second connection 218 in which the trail electrode 226 is supplied with steel from the second feeder 224 and power from the second weld power supply 228 via second power line 229. The second contact 222 can help to extend the gas shielding 236 through the supply of shielding gas and to create the arc 238, which helps to extend the weld pool 240. In one aspect, the second contact 222 does not create the arc 238 but provides heat to the weld pool 240 in order to maintain the weld pool at or higher than the melt temperature of the steel or work piece material. In another aspect, the trail electrode can arc or use different transfer mode as discussed herein.

Like the lead welding electrode 206, portions of the consumable trail electrode 226 can also be deposited in the weld pool 240 in order to maintain it at or around the melting temperature of the material of the work piece 230 or of steel. In another aspect, the trail electrode 226 may not be consumable but is used to help maintain the melting temperature. Alternatively or in addition to the first amount of ARM, a second amount of ARM can be deposited via a second path 250. The second amount of ARM can be deposited behind both the first contact 212 of the lead welding electrode 206 and second contact 222 of the trail electrode 226 or alternatively just behind the second contact 222 of the trail electrode 226. The ARM weld layer 232 is created by this process. By having the ARM materials such as tungsten carbide deposited in the weld pool and behind both the first and second contacts, a more uniform ARM is created. This process also creates thicker ARM and causes less distortion to the base material of the work piece 230. It should be noted that the first and second amount of ARM being deposited can be the same or different. Additionally, the desired mesh size can also be created.

During the process of depositing the first amount of ARM and/or the second amount of ARM, the work piece 230 is moved in the direction shown by the arrow. However, in other aspects of the disclosure, the components related to the trail electrode 226 can now become the components for the lead electrode 206 and vice versa in the event that the work piece 230 is moved in an opposite direction shown by the arrow. In another aspect, the work piece 230 is moved via a table or the electrodes are moved via robotic arms.

Figure 5:
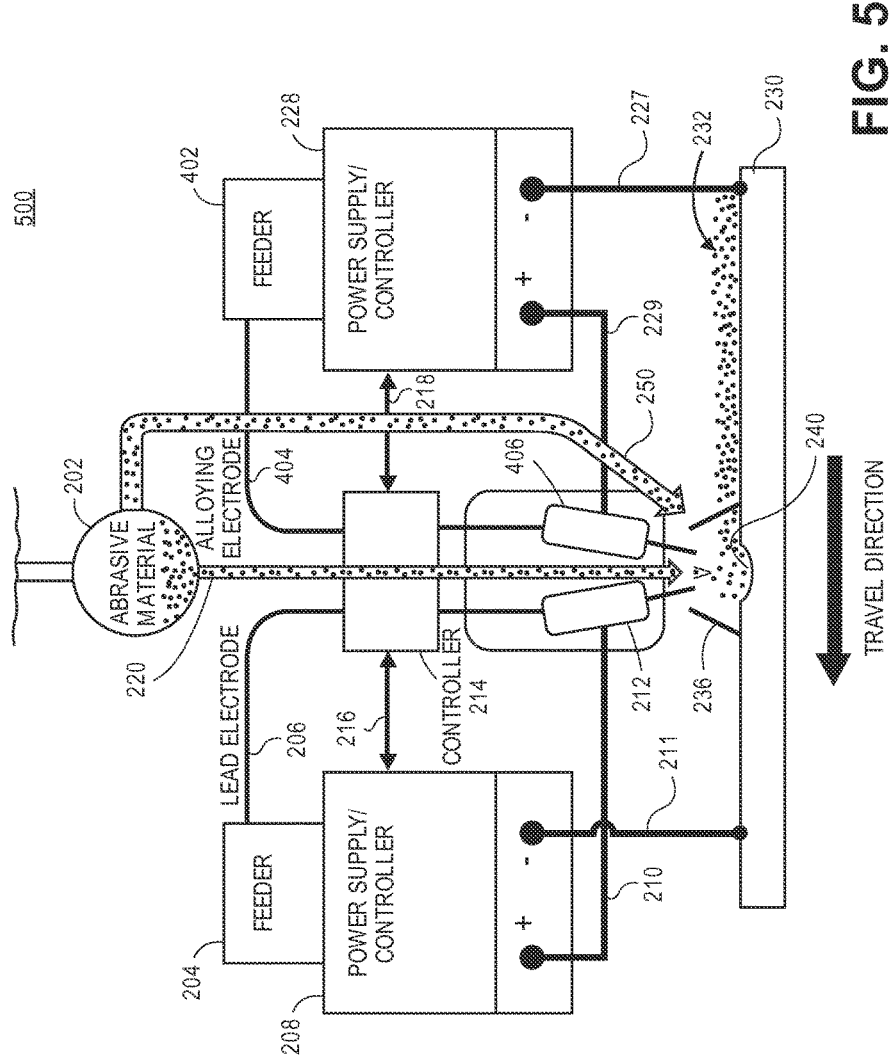
FIG. 5 illustrates a schematic diagram of a third exemplary welding system according to an aspect of the disclosure.

FIG. 5 illustrates a schematic diagram of a second exemplary welding system 500 according to an aspect of the disclosure. In this aspect of the disclosure, the second exemplary welding system 500 includes components of the first exemplary welding system 200 but the trail electrode is an alloying electrode. Components related a first contact 212 may include a first feeder 204 that may feed the consumable lead welding electrode 206 with a consumable electrode material such as mild carbon steel, which may ultimately be deposited into the molten weld pool 240. The first feeder 204 may include a spool of the consumable electrode that has its wire speed controlled by a controller 214. The controller 214 can also control the first welding power supply/controller 208 through a first connection 216. The first connection 216 to the first power supply 208 and the first feeder 204 may be wired or wireless. In one aspect of the disclosure, the power supply 208 can have its own controller. The first welding power supply 208 provides power to the first contact 212 via a first power line 210 and grounds to the work piece 230 via a first ground line 211. In another aspect of the disclosure, the controller 214 can control robot arms (not shown) that move the first contact 212 during the welding process.

The alloying electrode 404 is configured to be any alloy such as tungsten carbide from an alloy feeder 402. The alloy feeder 402 may have a spool of consumable electrode of the tungsten carbide that can readily feed into the alloy contact 406 and the wire speed can be controlled by the controller 214. The controller 214 can control the second welding power supply/controller 228 through a second connection 218. The second connection 218 to the second power supply 228 and the alloy feeder 402 may be wired or wireless. In one aspect of the disclosure, the second welding power supply 228 can have its own controller. The second power supply 228 provides power to the alloy contact 406 via a second power line 229 and grounds to the work piece via a second ground line 227. The alloy contact 406 receives the alloy material to be deposited on the melted weld pool 240 and the shielding gas to form the gas shielding 236.

In operation, the controller 214 can control the process via first connection 216 in which the lead welding electrode 206 is supplied with steel from the first feeder 204 and power from the first welding power supply 208 via first power line 210. The first contact 212 can create the gas shielding 236 through the supply of shielding gas (not shown) and the arc 238, which forms the weld pool 240 on the work piece 230. The gas shielding 236 controls the deposition of the melted steel generated by the first contact 212. Thus, portions of the consumable lead welding electrode 206 are deposited into the weld pool 240 in order to maintain it at or around a melting temperature of the material of the work piece 230. During or shortly after the weld pool 240 is created by the lead welding electrode 206, a first amount of ARM can be deposited via a first path 220 between the first contact 212 of the lead welding electrode 206 and the alloying contact 406 of the alloying electrode 404. The ARM may be delivered by gravity and/or power feeding methods using multiple drop tube, as an example.

Further, during, simultaneously or shortly after deposition of the ARM via first path 220 (after the first contact 212), the controller 214 can control via the second connection 218 in which the alloying electrode 226 is supplied with an alloy from the alloy feeder 402 and power from the second welding power supply 228 via a second power line 229. The alloying contact 406 can help to extend the gas shielding 236 through the supply of shielding gas and to create the arc 238, which helps to extend the weld pool 240. In one aspect, the alloying contact 406 does not create the arc 238 but provides heat to the weld pool 240 in order to maintain the weld pool at or higher than the melt temperature of the steel or work piece material. In another aspect, the alloying electrode can arc or use different transfer mode as discussed herein.

Like the lead welding electrode 206, portions of the consumable alloying electrode 404 can also be deposited into the weld pool 240 in order to maintain it at or around the melting temperature of the material of the work piece 230 or of steel. The alloy added via the alloying electrode can assist in obtaining a better and stronger ARM weld layer 232 depending on the type of alloy, type of AMR material and the work piece's material. In another aspect, the alloying electrode 226 may not be consumable but is used to help maintain the melting temperature. Alternatively or in addition to the first amount of ARM, a second amount of ARM can be deposited via a second path 250. The second amount of ARM can be deposited behind both the first contact 212 and alloying contact 406 or alternatively just behind the alloying contact 406. The ARM weld layer 232 is created by this process. By having the ARM materials such as tungsten carbide deposited in the weld pool and behind both the first and second contacts, a more uniform ARM is created. This process also creates thicker ARM and causes less distortion to the base material of the work piece 230. It should be noted that the first and second amount of ARM being deposited can be the same or different. Additionally, the desired mesh size can also be created.

The various aspects of the disclosure to create a better ARM on a component may also include weaving or dual-weave welding such as disclosed in U.S. Pat. No. 8,941,031, assigned to Caterpillar Inc., of Peoria, Ill. and is incorporated by reference herein in its entirety as if fully set forth herein. Further, a person skilled in the art would recognize that these processes can be conducted using automated or semi automated equipment including robotic equipment. Although various components are described related to a particular electrode, the same components may be used for both electrodes. For example, a single power supply may be used to power both the lead and the alloying electrode or multiple welding power supplies.

The process described above can be used to coat any component or part in any vehicle, device, apparatus and the like with an ARM in order to increase the component or part's life cycle. The process creates a molten weld pool with the lead welding electrode and the alloying electrode into which the ARM material is added.

INDUSTRIAL APPLICABILITY

A system of coating a component or part of any vehicle, device, apparatus and the like with abrasion resistant material (ARM) in order to increase the component or part's life cycle. In one aspect of the disclosure, a welding system can be used to deposit a first amount of ARM between a lead electrode and a trail electrode and deposit a second amount of ARM behind the trail electrode. In a second aspect of the disclosure, a welding system can be used that includes depositing the ARM between the first and second electrodes and the second electrode that also deposits an alloy. Although machines or vehicles are discussed herein, the various aspects of the disclosure may be used in any component, part or device that utilizes an ARM in order to increase its life cycle.

We claim:

1. A system for coating a component, comprising:
   a first electrode configured to receive a first consumable material from a first feeder;
   a first contact positioned at an end of the first electrode;
   a first power supply that provides power to the first contact;
   a second electrode configured to receive a second consumable material from a second feeder;
   a second contact positioned at an end of the second electrode;
   a second power supply that provides power to the second contact;
   a gas supply of a shielding gas that is coupled to the first and second contacts;
   a controller configured to control the first power supply, the second power supply, the first feeder and the second feeder, wherein the first contact creates an arc that forms a weld pool on a work piece; and
   an abrasive resistant material source that deposits a first amount of an abrasive resistant material between the first and second contacts and a second amount of the abrasive resistant material behind the second contact, wherein the first and second amounts of the abrasive resistant material are deposited into the weld pool.

2. The system of claim 1, wherein the first consumable material is mild carbon steel.

3. The system of claim 1, wherein the abrasive resistant material is tungsten carbide, silicon carbide, titanium carbide, boron nitride or boron carbide.

4. The system of claim 1, wherein the first and second contacts create a gas shielding that receives the first and second amounts of abrasive resistant material.

5. The system of claim 1, wherein the first consumable material is deposited on the weld pool to maintain the weld pool at a desired temperature.

6. The system of claim 1, wherein the second consumable material is deposited on the weld pool to maintain the weld pool at a desired temperature and is made from an alloy.

7. The system of claim 6, wherein the second contact does not create the arc but helps to maintain the weld pool at the desired temperature.

8. A system for coating a component, comprising:
   a first electrode configured to receive a consumable material from a first feeder;
   a first contact positioned at an end of the first electrode;
   a first power supply that provides power to the first contact;
   a second electrode configured to receive a consumable alloy material from a second feeder;
   a second contact positioned at an end of the second electrode;
   a second power supply that provides power to the second contact;
   a gas supply of a shielding gas that is coupled to the first and second contacts; and
   a controller configured to control the first power supply, the second power supply, the first feeder and the second feeder, wherein the first contact creates an arc that forms a weld pool on a work piece; and
   an abrasive resistant material source that deposits a first amount of an abrasive resistant material between the first and second contacts.

9. The system of claim 8, wherein the consumable material is mild carbon steel.

10. The system of claim 8, wherein the abrasive resistant material is tungsten carbide, silicon carbide, titanium carbide, boron nitride or boron carbide.

11. The system of claim 8, wherein the first and second contacts create a gas shielding that receives the consumable material and the consumable alloy material.

12. The system of claim 8, wherein the consumable material is deposited into the weld pool to maintain the weld pool at a desired temperature.

13. The system of claim 8, wherein the second contact does not create the arc but helps to maintain the weld pool at the desired temperature.

14. The system of claim 8, wherein a second amount of abrasive resistant material is deposited into the weld pool after the second contact.

15. A system for coating a component, comprising:
a first electrode configured to receive a consumable material;
a first contact positioned at an end of the first electrode;
a second electrode;
a second contact positioned at an end of the second electrode;
a power supply that provides power to the first and second contacts;
a gas supply of a shielding gas that is coupled to the first and second contacts;
a controller configured to control the power supply, wherein the first and second contacts create an arc that forms a weld pool on a work piece; and
an abrasive resistant material source that deposits a first amount of the abrasive resistant material between the first and second contacts and a second amount of the abrasive resistant material behind the second contact.

16. The system of claim 15, wherein the consumable material is mild carbon steel.

17. The system of claim 15, wherein the abrasive resistant material is tungsten carbide, silicon carbide, titanium carbide, boron nitride or boron carbide.

18. The system of claim 15, wherein the first and second contacts create a gas shielding that receives the first and second amounts of abrasive resistant material.

19. The system of claim 18, wherein the second contact does not create the arc but helps to maintain the weld pool at the desired temperature.

20. The system of claim 15, wherein the second electrode is not consumable when in the weld pool.

* * * * *